Dec. 3, 1957  L. C. AMMLUNG, JR., ET AL  2,815,413
DEVICE FOR OPERATING A TURN INDICATOR SWITCH
Filed Feb. 15, 1954  4 Sheets-Sheet 1
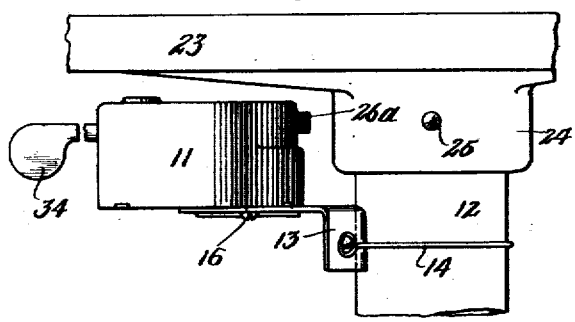
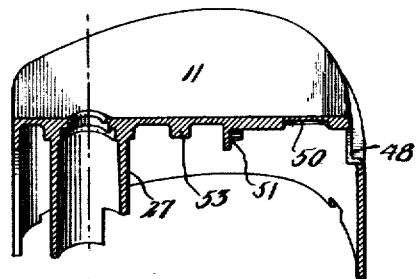
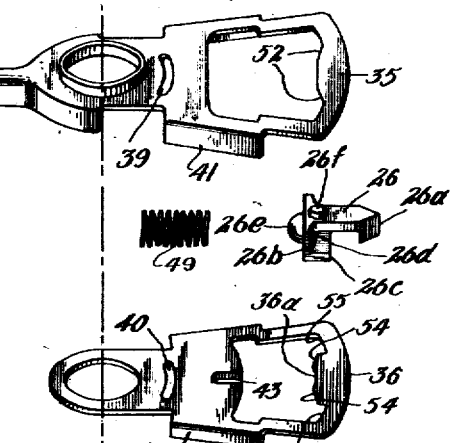
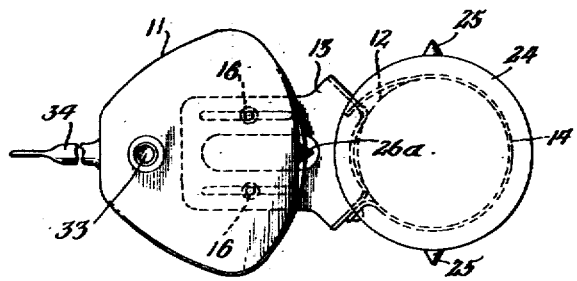
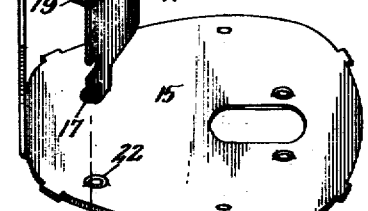

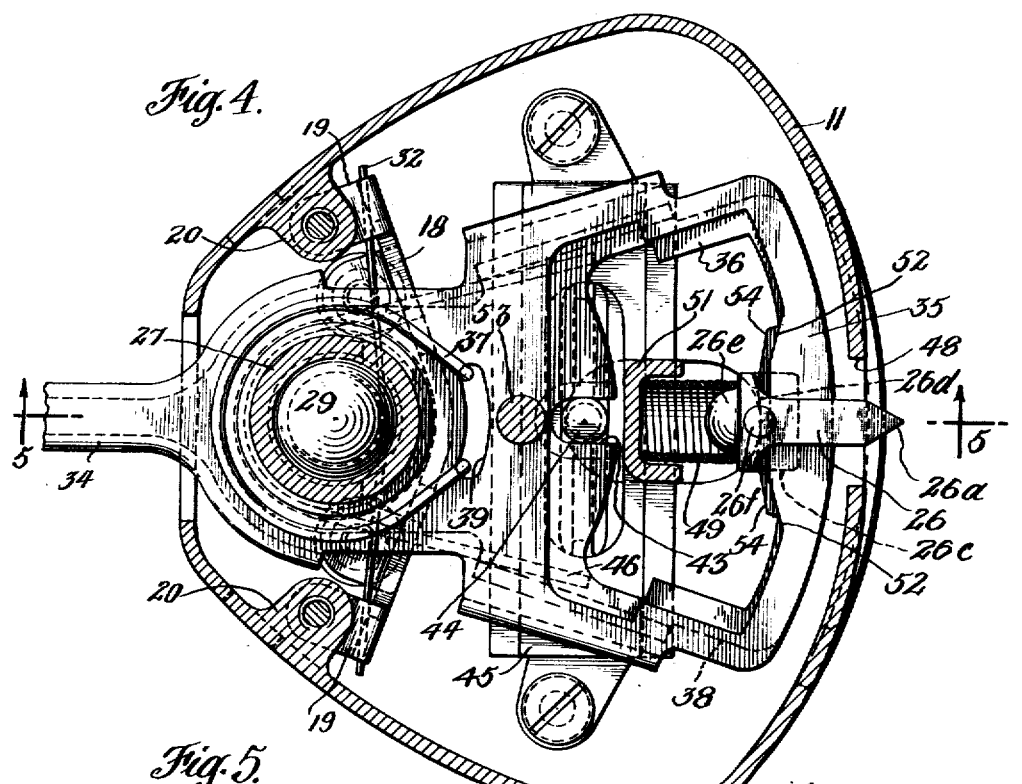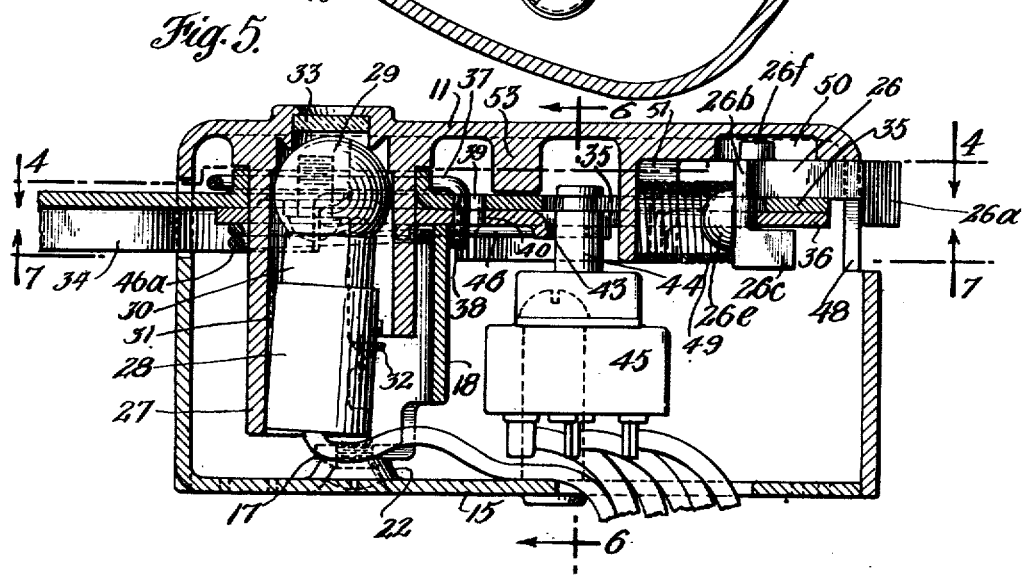

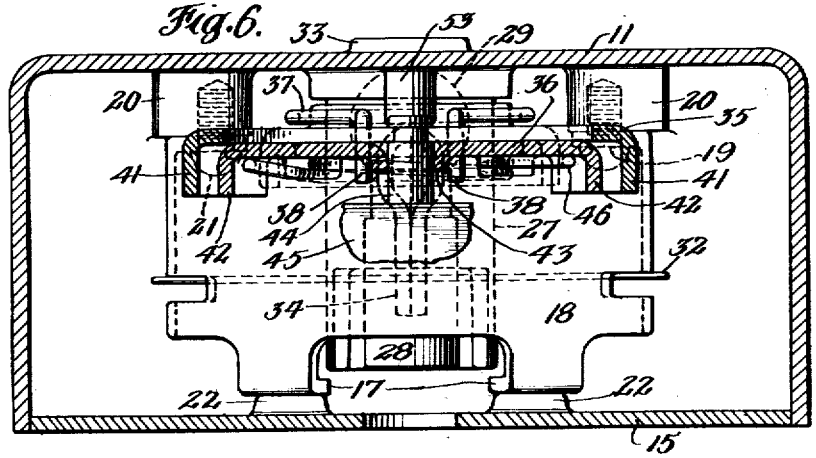
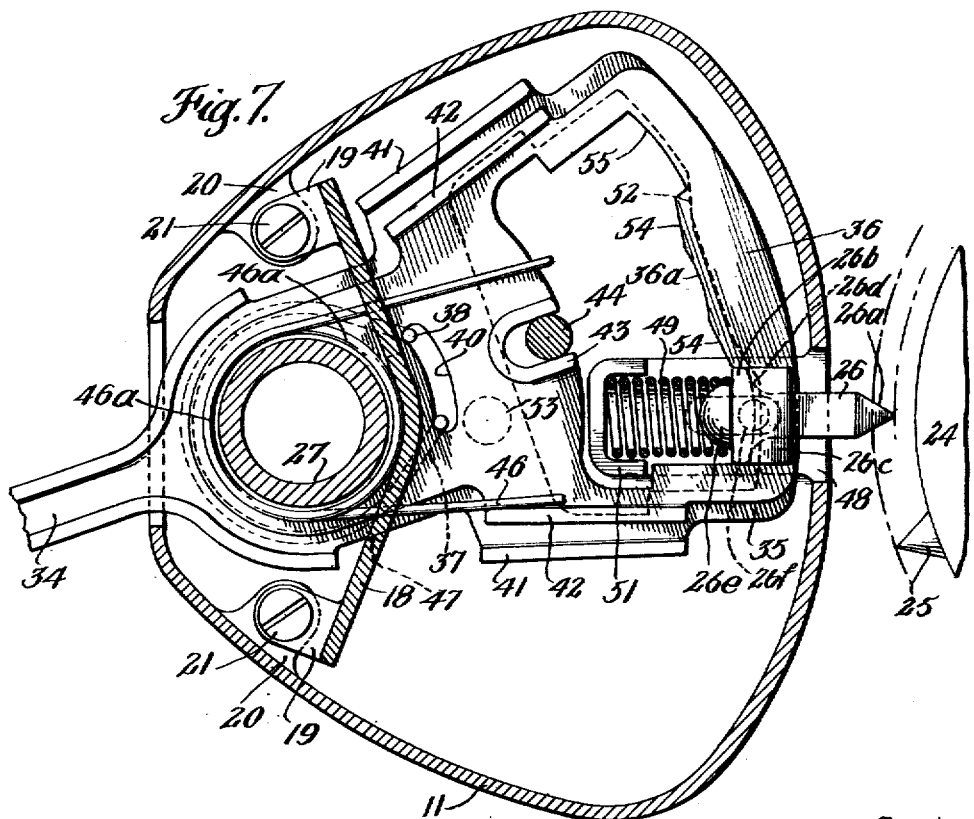

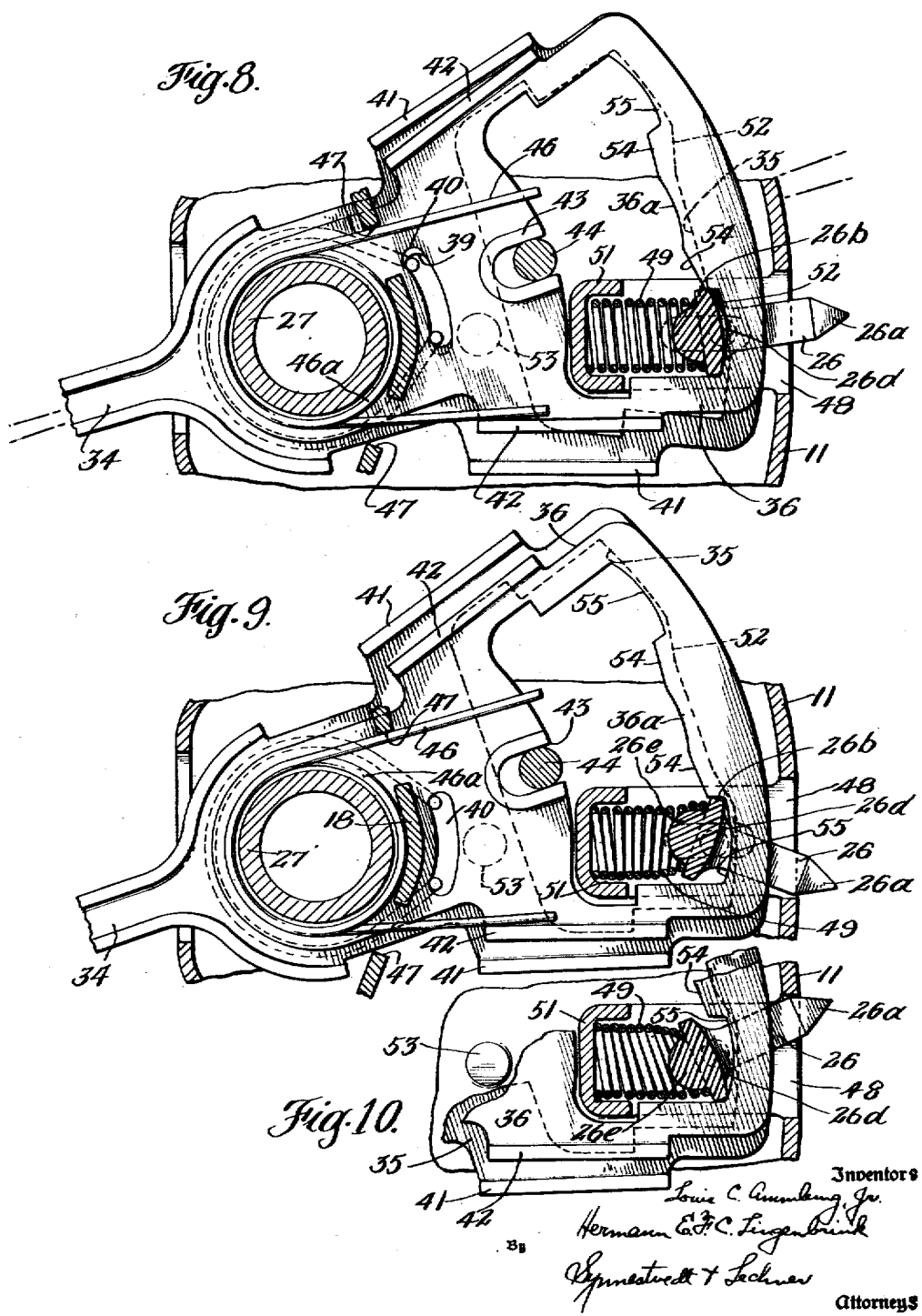

United States Patent Office 2,815,413
Patented Dec. 3, 1957

2,815,413

DEVICE FOR OPERATING A TURN INDICATOR SWITCH

Louis C. Ammlung, Jr., Philadelphia, and Hermann E. F. C. Lingenbrink, Hilltown, Pa., assignors to United Specialties Company, Holmsburg, Philadelphia, Pa., a corporation of Delaware Application February 15, 1954, Serial No. 410,137

11 Claims. (Cl. 200—61.35)

This invention relates to vehicle turn indicators and is particularly concerned with the provision of an improved mechanism for operating the switch of an automobile turn indicator.

As is well known, it is now common practice to provide automobiles with flashing signal lights including suitable mechanism for operating them to indicate the direction of the turn which the operator is contemplating. Such devices include, on the one hand, the necessary electrical equipment plus a suitable switch for controlling the required circuits and, on the other hand, a mechanical mechanism for actuating the switch. The present invention is concerned only with the latter portion of such equipment and relates to what is known as the latch-type of control mechanism for turn indicating systems in which type means are provided for setting the latch together with means for cancelling the setting either by hand or automatically by means of a finger carried by a rotating part of the steering mechanism.

The principal objects of the present invention are as follows:

(1) To provide an actuating device for a turn indicating mechanism in which the number of parts required to perform the necessary operations is materially reduced whereby to lessen both manufacturing and maintenance costs as well as to simplify production and installation of the device;

(2) To provide equipment of the type described which cannot be damaged even if the operator restrains the lever while the steering wheel is being rotated in the direction which would normally cancel the setting. As will further appear this safety feature is obtained without multiplying parts or springs;

(3) To materially reduce the size of a mechanism of this kind while at the same time increasing its functional reliability;

(4) To provide a latch type switch-actuating device in which but a single latch is required for both right and left hand turn indications, which latch, in either of the indicating positions, will function to positively hold the switch in its chosen setting, while permitting the cancelling finger to ride past the latch in the direction of the indicated turn without cancelling the setting, as well as to effect cancellation by means of the finger when the steering mechanism is rotated in the opposite direction, and also to permit hand cancelling at any time should the operator find it necessary to do so;

(5) To provide a construction in which the latch member, when in either of its indicating or holding positions, is adapted to rock in either of two directions, rocking in one direction being ineffective to cancel the setting while rocking in the other direction will effect cancellation and return of the parts to neutral position.

(6) To provide an operating mechanism for the switch of a turn indicating system in which the holding notches for the latch are provided in a member which is separate from the actuating lever, concentrically pivoted therewith and arranged to have some slight degree of relative rotational movement with respect to the hand lever.

(7) To pivot the operating parts upon a hollow member in which the flashing indicator light for the operator is adapted to be housed thereby rendering the mechanism as a whole more compact than is true of other equipment now available in the industry.

How the foregoing objects and advantages are attained together with such others as may appear hereinafter or are incident to our invention is illustrated in preferred form in the accompanying drawings wherein—

Figure 1 is a relatively small scale side elevation showing our improved device as applied to the steering column of an automobile, certain of the parts being broken away in order to increase the compactness of the view;

Figure 2 is a plan view of Figure 1 but with the steering wheel proper omitted, in order to better illustrate the hub portion thereof which carries the cancelling fingers, as will further appear;

Figure 3 is an exploded view of the various parts comprising my improved switch actuating device with the housing at the top and the other parts arranged thereunder in their proper series including the cover at the bottom;

Figure 4 is a somewhat enlarged section taken as indicated by the line 4—4 of Figure 5;

Figure 5 is a section taken as indicated by the line 5—5 on Figure 4;

Figure 6 is a vertical section taken as indicated by the line 6—6 of Figure 5;

Figure 7 is a bottom section taken as indicated by the line 7—7 on Figure 5 with the hand lever in the position it will occupy to indicate a right hand turn;

Figure 8 is a fragmentary sectional view similar to that of Figure 7 but with the lever in the act of hand cancelling the setting;

Figure 9 is another partial sectional view similar to that of Figure 8 but showing the latch as it will be rocked by movement of the steering wheel in the direction of the indication under which conditions the setting will not be cancelled; and Figure 10 is a view similar to those of Figures 7, 8 and 9 but illustrating only a small corner of the mechanism and showing how the latch is rocked when the setting is cancelled by a finger on the steering mechanism.

As will be seen from the drawings our improved operating mechanism for the switch of a turn indicator includes a generally cup shaped housing 11 which is mounted with the open side down on the steering column 12 of an automobile. The mounting is effected by means of a bracket 13 held in place by a strap 14 which can be drawn tightly around the steering column in any desired position and in any desired manner, the details of which form no part of our invention and, therefore, will not be further described. The cover 15 which closes the bottom of the housing 11 is secured to the supporting bracket 13 by means of a pair of screws 16, each of which is threaded into a horizontally disposed ear 17 upon what we term the spring guide 18. This guide has another pair of horizontal ears 19 on its opposite edge by means of which it can be secured to the holding lugs 20 as by screws 21, the lugs 20 being arranged to project inwardly from the wall of the housing 11. The holding screws 16 are countersunk in apertured bosses 22 in the cover 15.

The steering wheel 23 with its hub portion 24 is shown in Figure 1 as mounted on top of the steering column 12. At diagrammatically opposite points on the hub are a pair of laterally projecting cancelling fingers 25 which cooperate with a latch member in a member to be described below.

Interiorly, the housing 11 is provided with a cylindrical projection 27 of sufficient dimension to house within it a light socket 28 for the light bulb 29, the base 30 of which latter is provided with the lugs 31 which cooperate in the customary manner with the socket 28. The socket 28 is pressed firmly against the wall of the projecting cylinder portion 27 by means of a simple piece of spring wire 32 which contacts the socket 28 by virtue of the fact that the wall of the projecting portion 27 is cut out at one side. (See Figs. 3 to 6.) The wire 32 passes across this cut out portion and is bent slightly, as shown to best advantage in Figure 4, with the ends positioned to react against the side edges of the spring guide 18. In this way one side of the light bulb is adequately short circuited so that the bulb 29 will burn brightly when intended to do so. The light from this bulb is visible to the operator through a window 33 in the housing.

The projecting cylindrical portion 27 performs several additional functions. It acts as a pivot for the operating lever which comprises an exterior handle portion 34 and an interior actuating portion 35 and also for what we term a detent plate 36, the latter being of the same general configuration as the actuating portion 35 of the hand lever and being mounted adjacent thereto so that the two parts may cooperate as will further appear. They are formed as frame-like members which embrace the latch mechanism to be described below and from the drawings it will be seen that the hand lever and the detent plate are concentrically pivoted within the housing.

Under normal or inoperative conditions the detent plate 36 is centered with respect to the actuating portion 35 of the hand lever by means of the centering spring 37 which is U-shaped, as shown to best advantage in the exploded view of Figure 3, so that it can fit around the cylindrical portion 27 which thus serves as an anchor for this spring. The ends 38 of the centering spring are bent at right angles so that they will project through the arcuate slot 39 in the actuating portion 35 of the hand lever and, after passing therethrough, into the cooperating slot 40 in the detent plate 36. In this way the spring 37 functions to maintain the detent plate and the actuating portion of the hand lever in substantially central relationship. This spring also serves, in part at least, to constrain the detent plate and the hand lever to move in unison although yieldingly so for a functional purpose to appear more fully below. The two members are positively constrained to move together by means of the flanges 41 on the actuating portion of the hand lever and the cooperating flanges 42 on the adjacent portion of the detent plate, there being a pair of flanges 41 and another pair of flanges 42, as seen probably to best advantage in Figures 7 to 10 inclusive, examination of which will show that when the hand lever is moved the flanges 41 and 42 on one side or the other will come into contact depending upon the direction of motion and in this way the two parts will be constrained to move together.

Approximately centrally the detent plate is provided with a notch 43 which is adapted to embrace an operating post or stem 44 on the switch mechanism 45. The switch mechanism, per se, forms no part of the present invention so it will not be illustrated nor described in detail. Suffice it to say that in the present instance it embodies the features set forth in co-pending application of John J. Spicer, Jr., Serial No. 352,481, filed May 1, 1953, now abandoned, and assigned to the assignee of the present application. Such switch controls the circuits for the flashing signals including the circuit for the light bulb 29 above described.

The projecting portion 27 serves also as an anchor or a support for the return spring wire 46, said spring being formed with a central loop 46a, which is adapted to embrace the projection 27. The free ends of this spring are adapted to cooperate with the flanges 42 on the detent plate, one side functioning when the device is set for a right hand turn and the other side when set for a left hand turn as will appear more fully below. The end of the spring 46 opposite to the end which is in engagement with a flange 42 reacts against the side wall of a slot 47 in the upper edge of the spring guide 18, there being, of course, two oppositely disposed slots 47, one only of which comes into play at a time depending upon the direction in which the hand lever has been turned.

Turning now to the latch member, it will be seen that it includes a wedge-shaped portion 26a which is adapted to project through a suitable passageway 48 in the housing toward the path of movement of the cancelling fingers 25. This wedge-shaped portion is mounted on the end of a shank portion 26 which is provided at its inner end with a transverse base portion 26b. This latter terminates in a return flange portion 26c which forms with the shank 26 a slot which is adapted to embrace the adjacent surfaces of the detent plate 36 and the actuating portion 35 of the lever arm. The base 26d of the slot is somewhat curved so that the latch can rock slightly as will further appear. The base portions 26b carries a protruding hemispherical spring guide 26e adapted to fit within the coils of the latch spring 49. On its upper face the latch is provided with a projecting lug or button 26f which is adapted to cooperate with a guiding slot 50 on the interior of the housing 11 (see particularly Figure 5).

From the foregoing it will be seen that the latch is normally biased outwardly toward the path of movement of the cancelling fingers 25. However, when the device is inoperative, i. e., when the hand lever is in its mid or neutral position, such outward motion of the latch is prevented or restrained by the inner edge of the detent plate 36, which edge has a slight depression or curved portion 36a which serves to hold the parts in their mid or neutral position under the influence of the spring 49. The spring 49 is seated in and reacts against a pocket 51 formed on the interior wall of the housing 11.

Before turning to a description of the operation of our invention, we wish to call attention to the fact that the actuating portion 35 of the hand lever is provided with a pair of oppositely disposed cam surfaces 52, one on each side of the median line of the portion 35 and the interior of the housing 11 is provided with a bearing boss 53 over which the portion 35 is adapted to move during functioning of the apparatus as will further appear. The detent plate is similarly provided with a pair of oppositely disposed cam surfaces 54, one on each side of the recess 36a. The cam surfaces 52 and the cam surfaces 54 serve to retract the latch under different sets of operating conditions as will further appear.

*Summary of operation*

The more important portions of the structure of our improved device have all been described and we will now include a summary of the operation which will aid in an understanding of the invention.

The parts are in normally inoperative or neutral position as shown in Figures 1 and 4 to 6 inclusive in which figures it will be seen that the latch point 26a is shown in its retracted position in which position it does not reach into the path of movement of the fingers 25 on the steering wheel hub 24. It will be obvious that, when in this position, motion of the steering wheel and the fingers 25 will have no effect upon the device because there will not be contact between the fingers and the latch point 26a.

It will now be assumed that the operator wishes to indicate a right hand turn. This requires movement of the lever 34 into the position shown in Figure 7 in which connection it should be recalled that in this figure as well as in Figures 8 to 10 the mechanism is viewed from the bottom whereas in Figure 4 the mechanism is viewed from the top. When the lever is moved to the position shown in Figure 7, the latch will snap into the cooperating pocket or recess 55, in the detent plate 36, there being two of these pockets or recesses 55—one on each side so that a similar operation can take place for indicating a turn in the desired direction, either right or left but, in this description, only a right hand turn will be considered because the left hand turn indication is accomplished in exactly the same manner on the opposite side. However, at this point we wish to call attention to the fact that only one latch with its associated parts is required regardless of the direction of the indication.

As indicated, for a right hand turn, the latch assumes the position shown in Figure 7 where its operating tip 26a projects into the path of movement of the cancelling fingers 25 on the hub 24. This is shown by dot and dash lines.

In this position, the setting can be cancelled either by manual manipulation of the hand lever 34 or by means of the action of a cancelling finger 25 on the hub 24. Should the operator, for some reason, find it necessary to change the indication before it has been cancelled automatically in the normal operation of the vehicle, he can do so by returning the handle 34 to neutral position and the beginning of such a return movement is indicated in Figure 8 which shows the adjacent cam surface 52 on the portion 35 of the hand lever as riding against the curved portion 26d of the latch device which action will tip the latch 26a slightly as shown in Figure 8 and at the same time force it back against the pressure of its spring 49 and as the motion of the hand lever 34 is continued toward the neutral point, the latch will be completely withdrawn from its notch and will be restrained or held in its retracted position by the surface 36a of the detent lever.

If however the operator does not wish to cancel the indication, the setting will hold until such time as the steering wheel is turned in a left hand direction. In other words, turning of the wheel in a right hand direction (i. e., the direction of the indication) will not cancel the setting even if a finger 25 comes into contact with the projecting portion 26a of the latch. Such right hand turning of the steering wheel would be in a counterclockwise direction as shown in Figures 7 to 10. The only effect that contact of a finger 25 with the latch point 26a would have would be to tip the latch into the position shown in Figure 9 where it rocks upon its inner corner in the notch in which it rests, the other or opposite corner moving away from the outside corner of the notch and tending to slightly compress the spring 49 as clearly shown in this view.

As distinguished from the foregoing, an automatic cancelling under the influence of the steering wheel when it is moved in a left hand direction (i. e., to straighten out the car after it has made its right hand turn) is accomplished in the manner indicated in Figure 10 which shows the latch point 26a and the latch as a whole tipped in the opposite direction which would be the direction resulting from contact with the finger 25 when the wheel is turned in a left hand direction. In this view (Figure 10) the latch is rocked on its opposite edge so that its inner corner is freed of the notch 55 in which it had been resting, such action serving to compress the spring 49 on the inner side as indicated in this figure. At the same time the return spring 46 will immediately move the detent plate and the hand lever toward mid or neutral position and this, of course, will bring the cam surfaces 54 on the detent plate under the surface 26d of the latch and thereby retract the latch so that it will again engage the neutral notch 36a of the detent plate when the parts have all returned to mid or inoperative position.

We also wish to call attention to the fact that no damage whatsoever can result to the mechanism should the operator hold the hand lever in its set position while at the same time turning the steering wheel in the direction which would normally cancel the setting. This safety feature is an important one because it frequently happens that just such a condition will be encountered in service either by an intentional act of the operator or through some inadvertence.

Our improved operating mechanism is exceedingly simple and rugged in character and involves the use of fewer parts than has ever heretofore been possible with any turn indicators with which we are familiar. This reduces the cost as well as the problem of maintenance and insures long life. Furthermore, the simplicity of our improved construction is an outstanding advantage inasmuch as it renders the mechanism highly dependable throughout its life.

Finally, it is a marked advantage to arrange the various moving parts associated with the hand lever and the detent plate around the pivot itself upon which these parts are mounted, namely, around the hollow member 27 which also houses the light bulb for the flashing signal visible to the operator. This concentric pivot for the lever and the detent plate also serves as an anchor point for the centering spring 37 and the return spring 46.

We claim:

1. A device for operating the switch of an automobile turn indicator of the type where cancelling may be effected by a finger mounted on a rotating part of the steering mechanism; said device including a housing, a hand lever having an actuating portion within the housing and an exterior handle portion, a pivot upon which the hand lever is mounted at a point between the interior actuating portion and the exterior handle portion, a detent plate adjacent to and arranged in cooperative relationship with said actuating portion and mounted concentrically therewith upon said pivot, said actuating portion and said plate being adapted to have at least a small degree of relative rotative movement around said pivot, means adapted to constrain the lever and the plate to rotate together, a latch and spring means for biasing said latch toward the path of movement of the cancelling finger, the detent plate having a surface normally restraining such movement as well as an adjacent notch for permitting such movement when the hand lever is shifted to a turn indicating position, and said latch being adapted to rock on one edge in said notch without cancelling the indication when the finger on the steering mechanism is moved in the direction of the indication and to rock on the other edge to cancel the indication when the finger is moved in the opposite direction.

2. A device according to claim 1 wherein yielding means are included for normally centering the detent plate with respect to the lever.

3. A device according to claim 1 having yielding means normally centering the detent plate with respect to the lever and abutment means on the lever and on the plate which insure their motion together after their relative motion has occurred.

4. A device according to claim 1 wherein the detent plate is provided with a cam surface which retracts the latch when the setting is cancelled by the finger.

5. A device according to claim 1 wherein the lever is provided with a cam surface adapted to retract the latch upon hand cancellation of the setting.

6. A device according to claim 1 wherein the detent plate is provided with a cam surface which retracts the latch when the setting is cancelled by the finger and wherein the lever is provided with a cam surface adapted to retract the latch upon hand cancellation of the setting.

7. A device according to claim 1 wherein there is a notch for the latch on each side of the latch restraining surface, the latch being adapted to rock as specified when positioned in either of said notches whereby either a right hand or a left hand turn can be indicated and cancelled as described.

8. In a latch type turn indicator mechanism for steering wheels, the combination of a housing, a hand lever having an actuating portion within the housing and an exterior handle portion, a pivot upon which the hand lever is mounted at a point between the interior actuating portion and the exterior handle portion, a detent plate adjacent to and arranged in cooperative relationship with said actuating portion and mounted concentrically therewith upon said pivot, said actuating portion and said plate being capable of a small degree of relative rotative motion around said pivot, means constraining the lever and the detent plate to move together, a spring-loaded latch, a surface on the plate normally restraining the latch when the lever is in neutral position, a notch adjacent such surface into which the latch will snap when the lever is moved to indicate a turn, a return spring for restoring the detent plate to its latch restraining position, a cam surface on the detent plate for retracting the latch when said plate is so returned, and a cam surface on the lever adapted to retract the latch upon hand cancellation of the lever setting.

9. In an automobile turn indicator of the type which includes a circuit controlling switch and a cancelling finger on a rotating part of the steering mechanism; a device for operating the switch comprising a housing, a hand lever pivoted in the housing and having an exterior handle portion and an interior actuating portion, said lever having a neutral position where no turn is indicated and a turn indicating position on each isde of the neutral position, a detent plate pivoted concentrically with the lever, said plate lying adjacent said actuating portion and being adapted to cooperate therewith to operate the switch, said lever and said plate being capable of a small degree of relative rotative movement, yielding means normally centering the detent plate with relation to the actuating portion of the lever, a latch mounted in the housing and having a portion which is adapted to project through an opening in the housing into the path of movement of the cancelling finger, a spring for biasing said latch outwardly toward said path, the detent plate having a surface normally restraining said outward motion of the latch when the lever is in neutral position, a latching recess on the detent plate on each side of said latch restraining surface into one of which the latch is adapted to move when the lever is shifted to a turn indicating position, a return spring for restoring the detent plate to its latch restraining position when the latch is tripped by the cancelling finger, cam surfaces on the detent plate for retracting the latch when the detent plate is returned by said return spring, and a pair of oppositely disposed cam surfaces on the actuating portion of the lever adapted to retract the latch when the lever setting is hand cancelled.

10. A device according to claim 9 wherein the pivot for the lever and the detent plate is a tube within which is housed a turn indicator light bulb and socket.

11. A device according to claim 9 wherein the pivot for the lever and the detent plate serves also as an anchor point for the return spring.

References Cited in the file of this patent

UNITED STATES PATENTS

| 1,668,738 | Smith | May 8, 1928 |
| 1,690,370 | Hoeller | Nov. 6, 1928 |
| 1,947,681 | Stow | Feb. 20, 1934 |
| 2,249,120 | Doane et al. | July 15, 1941 |
| 2,276,413 | Moore | Mar. 17, 1942 |
| 2,611,842 | Lybrook et al. | Sept. 23, 1952 |
| 2,642,505 | Hept | June 16, 1953 |
| 2,678,358 | Thomson | May 11, 1954 |

UNITED STATES PATENT OFFICE
CERTIFICATE OF CORRECTION

Patent No. 2,815,413                                                               December 3, 1957

Louis C. Ammlung, Jr., et al.

It is hereby certified that error appears in the printed specification of the above numbered patent requiring correction and that the said Letters Patent should read as corrected below.

Column 2, line 70, for "member", second occurrence, read -- manner --.

Signed and sealed this 21st day of January 1958.

(SEAL)
Attest:

KARL H. AXLINE
Attesting Officer

ROBERT C. WATSON
                                                                               Commissioner of Patents